United States Patent
Kodemura et al.

(10) Patent No.: US 11,098,148 B2
(45) Date of Patent: Aug. 24, 2021

(54) LATEX COMPOSITION

(71) Applicant: ZEON CORPORATION, Tokyo (JP)

(72) Inventors: Junji Kodemura, Tokyo (JP); Misa Yamamoto, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/067,649

(22) PCT Filed: Jan. 23, 2017

(86) PCT No.: PCT/JP2017/002075
§ 371 (c)(1),
(2) Date: Jul. 2, 2018

(87) PCT Pub. No.: WO2017/130889
PCT Pub. Date: Aug. 3, 2017

(65) Prior Publication Data
US 2019/0010271 A1    Jan. 10, 2019

(30) Foreign Application Priority Data

Jan. 27, 2016 (JP) .............................. JP2016-012962

(51) Int. Cl.
| | | |
|---|---|---|
| *C08J 5/02* | (2006.01) | |
| *C08L 13/02* | (2006.01) | |
| *C08K 3/22* | (2006.01) | |
| *C08F 279/02* | (2006.01) | |
| *C08K 3/10* | (2018.01) | |
| *C08K 5/36* | (2006.01) | |
| *C08F 220/06* | (2006.01) | |
| *C08F 236/08* | (2006.01) | |
| *C08F 236/10* | (2006.01) | |
| *C08K 3/30* | (2006.01) | |
| *C08K 5/39* | (2006.01) | |
| *C08K 5/47* | (2006.01) | |
| *C08L 51/04* | (2006.01) | |

(52) U.S. Cl.
CPC .......... *C08F 279/02* (2013.01); *C08F 220/06* (2013.01); *C08F 236/08* (2013.01); *C08F 236/10* (2013.01); *C08J 5/02* (2013.01); *C08K 3/10* (2013.01); *C08K 3/22* (2013.01); *C08K 3/30* (2013.01); *C08K 5/36* (2013.01); *C08K 5/39* (2013.01); *C08K 5/47* (2013.01); *C08L 13/02* (2013.01); *C08L 51/04* (2013.01); *C08J 2313/02* (2013.01); *C08K 2003/2227* (2013.01)

(58) Field of Classification Search
CPC . C08K 3/10; C08K 3/105; C08K 3/22; C08K 3/30; C08K 5/39; C08K 5/47; C08K 2003/2227; C08L 51/04; C08L 13/00; C08L 13/02; C08L 9/00; C08L 9/10; C08L 7/02; C08F 279/02; C08F 220/06; C08F 236/08; C08C 19/28

See application file for complete search history.

(56) References Cited

U.S. PATENT DOCUMENTS

| | | | |
|---|---|---|---|
| 9,546,239 B2 * | 1/2017 | Nakamura | ............... C08K 5/42 |
| 2002/0101007 A1 | 8/2002 | Koide et al. | |
| 2003/0017286 A1 | 1/2003 | Williams et al. | |
| 2004/0092633 A1 | 5/2004 | Williams et al. | |
| 2008/0227913 A1 | 9/2008 | Koide | |
| 2015/0128329 A1 | 5/2015 | Amarasekera et al. | |
| 2015/0218352 A1 | 8/2015 | Enomoto et al. | |
| 2015/0376322 A1 | 12/2015 | Nakamura et al. | |

FOREIGN PATENT DOCUMENTS

| | | | |
|---|---|---|---|
| BE | 547273 A | | 10/1956 |
| GB | 862372 A | * | 3/1961 |
| WO | 00/73367 A1 | | 12/2000 |
| WO | 03/006513 A1 | | 1/2003 |
| WO | 2014/034889 A1 | | 3/2014 |
| WO | 2014/129547 A1 | | 8/2014 |
| WO | 2015/070276 A1 | | 5/2015 |

OTHER PUBLICATIONS

Mar. 21, 2017 International Search Report issued in International Patent Application No. PCT/JP2017/002075.
Ogawa et al., "Formaldehyde-specific IgE-mediated Urticaria Due to Formaldehyde in a Room Environment," Japanese Society of Occupational Medicine and Traumatology, vol. 57, No. 3, pp. 125-129, 2009.
Aug. 1, 2019 Search Report issued in European Patent Application No. 17744119.3.

* cited by examiner

*Primary Examiner* — Irina S Zemel
*Assistant Examiner* — Jeffrey S Lenihan
(74) *Attorney, Agent, or Firm* — Oliff PLC

(57) ABSTRACT

A latex composition is formed by adding an aqueous solution of an aluminum compound to a latex of a carboxyl group-containing synthetic polyisoprene and/or a carboxyl group-containing styrene-isoprene-styrene block copolymer. In the latex composition, the aqueous solution of an aluminum compound preferably has a pH of 5 to 13. In the latex composition, the aqueous solution of an aluminum compound is preferably an aqueous solution of a metal salt of aluminate.

5 Claims, No Drawings

LATEX COMPOSITION

TECHNICAL FIELD

The present invention relates to a latex composition, further specifically, to a latex composition having excellent mechanical properties and being capable of giving a molded film such as a dip-molded article that can prevent the occurrence of allergic symptoms of delayed allergy (Type IV) in addition to immediate allergy (Type I).

BACKGROUND ART

Conventionally, molded films obtained by molding a latex composition containing a natural rubber latex into a film have been known. For example, as such molded films, dip-molded products obtained by dip-molding a latex composition containing a natural rubber latex and used in contact with human bodies, such as nipples, balloons, gloves, balloons, and stalls, are known. However, natural rubber latex contains proteins that cause symptoms of immediate allergy (Type I) in human bodies and therefore may be problematic as dip-molded products that directly contact the mucosa or organs of living bodies. Therefore, use of a synthetic polyisoprene latex or a styrene-isoprene-styrene block copolymer latex instead of natural rubber latex has been studied (Patent Document 1).

However, in such a technique of using a synthetic polyisoprene latex or a styrene-isoprene-styrene block copolymer latex, if the amounts of a sulfur vulcanizing agent and a sulfur vulcanization accelerator used are excessively large in the production process of dip-molded products, the dip-molded products to be obtained may cause allergic symptoms of delayed allergy (Type IV) when they are in contact with human bodies in some cases, due to sulfur contained in the dip-molded products, while the occurrence of immediate allergy (Type I) can be prevented.

RELATED ART DOCUMENTS

Patent Documents

Patent Document 1: International Publication No. WO 2014/129547

SUMMARY OF THE INVENTION

Problem to be Solved by the Invention

The present invention has been made in view of such an actual situation described above, and an object thereof is to provide a latex composition having excellent mechanical properties and being capable of giving a dip-molded article that can prevent the occurrence of allergic symptoms of delayed allergy (Type IV) in addition to immediate allergy (Type I), and a molded film such as a dip-molded product that is obtained using such a latex composition.

Means for Solving the Problem

As a result of dedicated research to achieve the aforementioned object, the inventors have found that the aforementioned object can be achieved by a latex composition famed by adding an aqueous solution of an aluminum compound to a latex of a carboxyl group-containing synthetic polyisoprene and/or a carboxyl group-containing styrene-isoprene-styrene block copolymer, thereby accomplishing the present invention.

That is, according to the present invention, a latex composition famed by adding an aqueous solution of an aluminum compound to a latex of a carboxyl group-containing synthetic polyisoprene and/or a carboxyl group-containing styrene-isoprene-styrene block copolymer is provided.

In the latex composition of the present invention, the aqueous solution of the aluminum compound preferably has a pH of 5 to 13.

In the latex composition of the present invention, the aqueous solution of an aluminum compound is preferably an aqueous solution of a metal salt of aluminate.

In the latex composition of the present invention, the carboxyl group-containing synthetic polyisoprene is preferably obtained by graft polymerization of a monomer having a carboxyl group onto a synthetic polyisoprene.

In the latex composition of the present invention, the carboxyl group-containing styrene-isoprene-styrene block copolymer is preferably obtained by graft polymerization of a monomer having a carboxyl group onto a styrene-isoprene-styrene block copolymer.

The latex composition of the present invention preferably further comprises 0.05 to 1.0 part by weight of a sulfur vulcanizing agent with respect to 100 parts by weight of the total of the carboxyl group-containing synthetic polyisoprene and the carboxyl group-containing styrene-isoprene-styrene block copolymer.

The latex composition of the present invention preferably further comprises 0.05 to 1.0 part by weight of a sulfur vulcanization accelerator with respect to 100 parts by weight of the total of the carboxyl group-containing synthetic polyisoprene and the carboxyl group-containing styrene-isoprene-styrene block copolymer.

The latex composition of the present invention preferably has a pH of 7 to 13.

Further, according to the present invention, a molded film consisting of the aforementioned latex composition of the present invention is provided.

Further, according to the present invention, a method for producing a dip-molded product, comprising a step of dip-molding the aforementioned latex composition of the present invention is provided.

Effects of Invention

According to the present invention, a latex composition having excellent mechanical properties and being capable of giving a dip-molded article that can prevent the occurrence of allergic symptoms of delayed allergy (Type IV) in addition to immediate allergy (Type I), and a molded film such as a dip-molded product that is obtained using such a latex composition and has the aforementioned characteristics can be provided.

DESCRIPTION OF EMBODIMENTS

The latex composition of the present invention is famed by adding an aqueous solution of an aluminum compound to a latex of a carboxyl group-containing synthetic polyisoprene and/or a carboxyl group-containing styrene-isoprene-styrene block copolymer (which may be hereinafter abbreviated as "SIS").

Carboxyl Group-Containing Synthetic Polyisoprene Latex

The carboxyl group-containing synthetic polyisoprene latex used in the present invention is a latex of a polymer obtained by introducing a carboxyl group into a synthetic polyisoprene obtained by polymerizing isoprene-containing monomers. Hereinafter, the synthetic polyisoprene that is used for producing the carboxyl group-containing synthetic polyisoprene latex used in the present invention will be first described.

The synthetic polyisoprene may be a homopolymer of isoprene or may be a copolymer of isoprene with other ethylenically unsaturated monomers that are copolymerizable with isoprene. The content of isoprene units in the synthetic polyisoprene is preferably 70 wt % or more, more preferably 90 wt % or more, further preferably 95 wt % or more, particularly preferably 100 wt % (homopolymer of isoprene), with respect to all monomer units, for ease of obtaining a dip-molded product that is flex and has excellent tensile strength.

Examples of the other ethylenically unsaturated monomers that are copolymerizable with isoprene include conjugated diene monomers other than isoprene such as butadiene, chloroprene, and 1,3-pentadiene; ethylenically unsaturated nitrile monomers such as acrylonitrile, methacrylonitrile, fumaronitrile, and α-chloroacrylonitrile; vinyl aromatic monomers such as styrene and alkyl styrene; and ethylenically unsaturated carboxylic acid ester monomers such as methyl (meth)acrylate (which means "methyl acrylate and/or methyl methacrylate", and the same hereinafter applies to ethyl (meth)acrylate and the like), ethyl (meth) acrylate, butyl (meth)acrylate, and (meth)acrylic acid-2-ethylhexyl. One of these other ethylenically unsaturated monomers that are copolymerizable with isoprene may be used alone, or a plurality of them may be used in combination.

The synthetic polyisoprene can be obtained by a conventionally known method, for example, by solution polymerization of isoprene with other ethylenically unsaturated copolymerizable monomers used as required, in an inert polymerization solvent, using a Ziegler polymerization catalyst composed of trialkylaluminum-titanium tetrachloride or an alkyl lithium polymerization catalyst such as n-butyl lithium and sec-butyl lithium. The polymer solution of the synthetic polyisoprene obtained by the solution polymerization may be used as it is for producing the synthetic polyisoprene latex, which will be described below, but can be used for producing the synthetic polyisoprene latex by extracting a solid synthetic polyisoprene from the polymer solution and thereafter dissolving it in an organic solvent.

At this time, impurities such as the residue of the polymerization catalyst remaining in the polymer solution after the synthesis may be removed. Further, an anti-aging agent, which will be described below, may be added into the solution during the polymerization or after the polymerization. Further, a commercially available solid synthetic polyisoprene also can be used.

There are four types of the isoprene units in the synthetic polyisoprene, depending on the bonding state of isoprene, which are cis bond units, trans bond units, 1,2-vinyl bond units, and 3,4-vinyl bond units. For improving the tensile strength of the dip-molded product to be obtained, the content proportion of the cis bond units in the isoprene units contained in the synthetic polyisoprene is preferably 70 wt % or more, more preferably 90 wt % or more, further preferably 95 wt % or more, with respect to all isoprene units.

The weight-average molecular weight of the synthetic polyisoprene is preferably 10,000 to 5,000,000, more preferably 500,000 to 3,000,000, further preferably 700,000 to 2,000,000, in tams of standard polystyrene by gel permeation chromatography. Adjusting the weight-average molecular weight of the synthetic polyisoprene to the aforementioned range tends to improve the tensile strength of the dip-molded product and facilitate the production of synthetic polyisoprene latex.

Further, the polymer/Mooney viscosity (ML1+4 at 100° C.) of the synthetic polyisoprene is preferably 50 to 100, more preferably 60 to 95, further preferably 70 to 90, most preferably 75 to 85.

A carboxyl group-containing synthetic polyisoprene can be obtained by introducing a carboxyl group into the thus produced synthetic polyisoprene. The method for introducing the carboxyl group into the synthetic polyisoprene is not specifically limited, but examples thereof include a method of graft-polymerizing a monomer having a carboxyl group onto the synthetic polyisoprene in the water phase. At this time, for graft-polymerizing the monomer having a carboxyl group in the water phase, a synthetic polyisoprene latex is desirably used.

Examples of the method for obtaining a synthetic polyisoprene latex include (1) a method for producing a synthetic polyisoprene latex by emulsifying a solution or a microsuspension of the synthetic polyisoprene dissolved or finely dispersed in an organic solvent, in water, in the presence of an anionic surfactant and removing the organic solvent, as required, and (2) a method for directly producing a synthetic polyisoprene latex by emulsion polymerization or suspension polymerization of isoprene alone or a mixture of isoprene with an ethylenically unsaturated monomer that is copolymerizable with isoprene, in the presence of an anionic surfactant. The aforementioned production method (1) is preferable since the synthetic polyisoprene with cis bond units at a high proportion in the isoprene units can be used, and a dip-molded product having excellent mechanical properties such as tensile strength is easily obtained.

Examples of the organic solvent used in the aforementioned production method (1) include aromatic hydrocarbon solvents such as benzene, toluene, and xylene; alicyclic hydrocarbon solvents such as cyclopentane, cyclopentene, cyclohexane, and cyclohexene; aliphatic hydrocarbon solvents such as pentane, hexane, and heptane; and halogenated hydrocarbon solvents such as methylene chloride, chloroform, and ethylene dichloride. Among these, alicyclic hydrocarbon solvents are preferable, and cyclohexane is particularly preferable.

The amount of the organic solvent to be used is preferably 2,000 parts by weight or less, more preferably 20 to 1,500 parts by weight, further preferably 500 to 1000, most preferably 100 to 400, with respect to 100 parts by weight of the synthetic polyisoprene.

Examples of the anionic surfactants to be used in the aforementioned production method (1) include fatty acid salts such as sodium laurate, potassium myristate, sodium palmitate, potassium oleate, sodium linolenate, and sodium rosinate; alkylbenzenesulfonates such as sodium dodecylbenzenesulfonate, potassium dodecylbenzenesulfonate, sodium decylbenzenesulfonate, potassium decylbenzenesulfonate, sodium cetylbenzenesulfonate, and potassium cetylbenzenesulfonate; alkyl sulfosuccinates such as sodium di(2-ethylhexyl) sulfosuccinate, potassium di(2-ethylhexyl) sulfosuccinate, and sodium dioctyl sulfosuccinate; alkyl sulfate ester salts such as sodium lauryl sulfate and potassium lauryl sulfate; polyoxyethylene alkyl ether sulfate ester salts such as sodium polyoxyethylene lauryl ether sulfate and potassium polyoxyethylene lauryl ether sulfate; and monoalkyl phosphates such as sodium lauryl phosphate and potassium lauryl phosphate.

Among these anionic surfactants, fatty acid salts, alkylbenzenesulfonates, alkyl sulfosuccinates, alkyl sulfate ester salts, and polyoxyethylene alkyl ether sulfate ester salts are preferable, and fatty acid salts and alkylbenzenesulfonates are particularly preferable.

Further, use of at least one selected from the group consisting of alkylbenzenesulfonates, alkyl sulfosuccinates, alkyl sulfate ester salts, and polyoxyethylene alkyl ether sulfate ester salts in combination with fatty acid salts is preferable, and use of alkylbenzenesulfonates in combination with fatty acid salts is particularly preferable, because a slight amount of the residual polymerization catalyst (particularly, aluminum and titanium) derived from the synthetic polyisoprene can be more efficiently removed and generation of aggregates is suppressed in the production of the latex composition. Here, as fatty acid salts, sodium rosinate and potassium rosinate are preferable, and as alkylbenzenesulfonates, sodium dodecylbenzenesulfonate and potassium dodecylbenzenesulfonate are preferable. Further, one of these surfactants may be used alone, or two or more of them may be used in combination.

As described above, use of at least one selected from the group consisting of alkylbenzenesulfonates, alkyl sulfosuccinates, alkyl sulfate ester salts, and polyoxyethylene alkyl ether sulfate ester salts in combination with fatty acid salts allows the obtained latex to contain the at least one selected from alkylbenzenesulfonates, alkyl sulfosuccinates, alkyl sulfate ester salts, and polyoxyethylene alkyl ether sulfate ester salts, and fatty acid salts.

Further, in the aforementioned production method (1), surfactants other than the anionic surfactants may be used in combination, and examples of the surfactants other than the anionic surfactants include copolymerizable surfactants such as sulfoesters of $\alpha,\beta$-unsaturated carboxylic acids, sulfate esters of $\alpha,\beta$-unsaturated carboxylic acids, sulfoalkyl aryl ethers.

Further, nonionic surfactants such as polyoxyethylene alkyl ethers, polyoxyethylene alkyl phenol ethers, polyoxyethylene alkyl esters, and polyoxyethylene sorbitan alkyl esters may be used in combination, as long as coagulation by the coagulant that is used in dip molding is not inhibited.

The amount of anionic surfactants to be used in the aforementioned production method (1) is preferably 0.1 to 50 parts by weight, more preferably 0.5 to 20 parts by weight, further preferably 1 to 10 parts by weight, with respect to 100 parts by weight of the synthetic polyisoprene. In the case of using two or more surfactants, the total amount of the surfactants to be used preferably falls within the aforementioned range. That is, for example, in the case of using at least one selected from alkylbenzenesulfonates, alkyl sulfosuccinates, alkyl sulfate ester salts, and polyoxyethylene alkyl ether sulfate ester salts in combination with fatty acid salts, the total amount of these surfactants to be used preferably falls within the aforementioned range. An excessively small amount of anionic surfactants to be used may possibly cause a large amount of aggregates in emulsification, or conversely, an excessively large amount thereof facilitates foaming and may possibly cause pinholes in the dip-molded product to be obtained.

Further, in the case of using at least one selected from alkylbenzenesulfonates, alkyl sulfosuccinates, alkyl sulfate ester salts, and polyoxyethylene alkyl ether sulfate ester salts in combination with fatty acid salts as anionic surfactants, the ratio of these surfactants to be used is preferably adjusted to a range of 1:1 to 10:1, more preferably to a range of 1:1 to 7:1, as a weight ratio of "fatty acid salts":"total of at least one surfactant selected from alkylbenzenesulfonates, alkyl sulfosuccinates, alkyl sulfate ester salts, and polyoxyethylene alkyl ether sulfate ester salts". An excessively large ratio of the at least one surfactant selected from alkylbenzenesulfonates, alkyl sulfosuccinates, alkyl sulfate ester salts, and polyoxyethylene alkyl ether sulfate ester salts to be used may possibly cause intense foaming when handling the synthetic polyisoprene, thereby making operations such as long-term standing and addition of a defoamer necessary, which may possibly lead to a decrease in workability and an increase in cost. Meanwhile, an excessively small ratio of the at least one surfactant selected from alkylbenzenesulfonates, alkyl sulfosuccinates, alkyl sulfate ester salts, and polyoxyethylene alkyl ether sulfate ester salts to be used may possibly cause aggregates during addition of the monomer having a carboxyl group in graft polymerization of the monomer having a carboxyl group.

The amount of water to be used in the aforementioned production method (1) is preferably 10 to 1,000 parts by weight, more preferably 30 to 500 parts by weight, most preferably 50 to 100, with respect to 100 parts by weight of the organic solvent solution of the synthetic polyisoprene. Examples of the type of water to be used include hard water, soft water, deionized water, distilled water, zeolite water and the like, and soft water, deionized water, and distilled water are preferable.

As the device that emulsifies the solution or the microsuspension of the synthetic polyisoprene dissolved or finely dispersed in the organic solvent, in water, in the presence of anionic surfactants, devices that are commercially available in general as emulsifying machines or dispersers can be used without specific limitation. The method for adding the anionic surfactants to the solution or the microsuspension of the synthetic polyisoprene is not specifically limited, and the anionic surfactants may be added in advance to either water, or the solution or the microsuspension of the synthetic polyisoprene, or both of them, or may be added in a lump or dividedly to the emulsified liquid during the emulsification operation.

Examples of the emulsifying device include batch emulsifying machines such as the product name "Homogenizer" (manufactured by IKA Works), the product name "POLYTRON" (manufactured by Kinematica AG), and the product name "TK AUTO-HOMO MIXER" (manufactured by Tokushu Kika Kogyo Co., Ltd.); continuous emulsifying machines such as the product name "TK PIPELINE-HOMO MIXER" (manufactured by Tokushu Kika Kogyo Co., Ltd.), the product name "Colloid mill" (manufactured by Shinko Pantec Co., Ltd.), the product name "SLASHER" (manufactured by NIPPON COKE & ENGINEERING CO., LTD.), the product name "Trigonal wet grinder" (manufactured by Mitsui Miike Chemical Engineering Machinery, Co., Ltd.), the product name "CAVITRON" (manufactured by Eurotec, Ltd.), the product name "MILDER" (manufactured by Pacific Machinery & Engineering Co., Ltd.), and the product name "FINE FLOW MILL" (manufactured by Pacific Machinery & Engineering Co., Ltd.); high-pressure emulsifying machines such as the product name "Microfluidizer" (manufactured by MIZUHO INDUSTRIAL CO., LTD.), the product name "NANOMIZER" (manufactured by NANOMIZER Inc.), and the product name "APV GAULIN" (manufactured by Manton-Gaulin Company); membrane emulsifying machines such as the product name "Membrane emulsifying machine" (manufactured by REICA Co., Ltd.); vibratory emulsifying machines such as the product name "VIBROMIXER" (manufactured by REICA Co., Ltd.); and ultrasonic emulsifying machines such as the product name "Ultrasonic homogenizer" (manufactured by Branson Ultrasonics Corporation). The conditions for the emulsification operation by such emulsifying devices are not specifically limited, and the processing temperature, the processing time, and the like, may be appropriately determined so that a desired dispersion state is achieved.

In the aforementioned production method (1), the organic solvent is desirably removed from the emulsion obtained by the emulsification operation.

As the method for removing the organic solvent from the emulsion, methods that can reduce the content of the organic solvent (preferably, an alicyclic hydrocarbon solvent) in the synthetic polyisoprene latex to be obtained to 500 weight ppm or less are preferable, and methods such as vacuum distillation, normal pressure distillation, water vapor distillation, and centrifugation can be employed, for example.

Subsequently, using the synthetic polyisoprene latex obtained by the aforementioned production method (1), the carboxyl group-containing synthetic polyisoprene latex used in the present invention can be obtained by graft-polymerizing a monomer having a carboxyl group onto the synthetic polyisoprene in the water phase.

The method for obtaining the carboxyl group-containing synthetic polyisoprene latex by graft-polymerizing the monomer having a carboxyl group onto the synthetic polyisoprene in the water phase is not specifically limited, and conventionally known graft polymerization methods can be employed.

Examples of the monomer having a carboxyl group can include ethylenically unsaturated monocarboxylic acid monomers such as acrylic acid and methacrylic acid; ethylenically unsaturated polyvalent carboxylic acid monomers such as itaconic acid, maleic acid, fumaric acid, and butene tricarboxylic acid; partial ester monomers of ethylenically unsaturated polyvalent carboxylic acids such as monobutyl fumarate, monobutyl maleate, and mono-2-hydroxypropyl maleate; and polyvalent carboxylic acid anhydrides such as maleic anhydride and citraconic anhydride, and ethylenically unsaturated monocarboxylic acid monomers are preferable, and acrylic acid and methacrylic acid are particularly preferable, for achieving further remarkable effects of the present invention. One of these monomers may be used alone, or two or more of them may be used in combination.

Further, the aforementioned carboxyl group includes those in the form of salts with alkali metals, ammonia, and the like.

The amount of the monomer having a carboxyl group to be used is preferably 0.01 parts by weight to 100 parts by weight, more preferably 0.01 parts by weight to 40 parts by weight, further preferably 0.5 parts by weight to 20 parts by weight, with respect to 100 parts by weight of the synthetic polyisoprene. When the amount of the monomer having a carboxyl group to be used is excessively small, the tensile strength of the dip-molded product to be obtained tends to be low. Conversely, when the amount of the monomer having a carboxyl group to be used is excessively large, the viscosity of the carboxyl group-containing synthetic polyisoprene latex to be obtained excessively increases, which may result in difficult handling in some cases.

The method for adding the monomer having a carboxyl group to the synthetic polyisoprene latex is not specifically limited, and known addition methods such as one-time addition, divided addition, and continuous addition can be employed.

Further, in the present invention, it is preferable to add a redox catalyst in which an organic peroxide is combined with a reductant to the synthetic polyisoprene latex obtained by the aforementioned production method (1) in addition to the monomer having a carboxyl group, to cause crosslinking reaction of the synthetic polyisoprene simultaneously with the graft polymerization of the monomer having a carboxyl group in the water phase, during the production of the carboxyl group-containing synthetic polyisoprene latex, so that the undissolved residue of tetrahydrofuran of the carboxyl group-containing synthetic polyisoprene contained in the carboxyl group-containing synthetic polyisoprene latex is preferably 30 wt % or more, more preferably 60 wt % or more. Adjusting the undissolved residue of tetrahydrofuran to 30 wt % or more can further enhance the tensile strength of the dip-molded product to be obtained.

Examples of the organic peroxide used for the crosslinking reaction include diisopropyl benzene hydroperoxide, cumene hydroperoxide, t-butyl hydroperoxide, 1,1,3,3-tetramethylbutyl hydroperoxide, di-t-butyl peroxide, isobutyryl peroxide, and benzoyl peroxide and the like, and 1,1,3,3-tetramethylbutyl hydroperoxide is preferable for improving mechanical properties of the dip-molded product to be obtained. One of these organic peroxides may be used alone, or two or more of them may be used in combination.

The amount of the organic peroxide to be used is not specifically limited, but is preferably 0.01 to 3 parts by weight, more preferably 0.1 to 1 part by weight, with respect to 100 parts by weight of the synthetic polyisoprene.

Examples of the reductant include compounds containing reduced metal ions such as ferrous sulfate and cuprous naphthenate; sulfonic acid compounds such as sodium methanesulfonate; and amine compounds such as dimethyl aniline. One of these reductants may be used alone, or two or more of them may be used in combination.

The amount of the reductant to be used is not specifically limited, but is preferably 0.01 to 1 part by weight with respect to 1 part by weight of the organic peroxides.

In the case of crosslinking the synthetic polyisoprene simultaneously with the graft polymerization of the monomer having a carboxyl group using the redox catalyst in which an organic peroxide is combined with a reductant, conventionally known graft polymerization methods can be employed. Further, as the method for adding the organic peroxide and the reductant, known addition methods such as one-time addition, divided addition, and continuous addition can be employed.

In the case of performing the graft polymerization using the redox catalyst, the reaction temperature is preferably 5 to 70° C., more preferably 10 to 70° C.

The graft polymerization of the monomer having a carboxyl group and the crosslinking of the synthetic polyisoprene may be performed separately. In this case, examples of the polymerization catalyst for the graft polymerization (graft polymerization catalyst) can include inorganic peroxides such as sodium persulfate, potassium persulfate, ammonium persulfate, potassium superphosphate, and hydrogen peroxide; organic peroxides such as diisopropyl benzene hydroperoxide, cumene hydroperoxide, t-butyl hydroperoxide, 1,1,3,3-tetramethylbutyl hydroperoxide, di-t-butyl peroxide, isobutyryl peroxide, and benzoyl peroxide; and azo compounds such as 2,2'-azobisisobutyronitrile, azobis-2,4-dimethylvaleronitrile, and methyl azobisisobutyrate, and organic peroxides are preferable, and 1,1,3,3-tetramethylbutyl hydroperoxide is particularly preferable, for improving the mechanical properties of the dip-molded product to be obtained.

One of the aforementioned graft polymerization catalysts can be used alone, or two or more of them can be used in combination. The amount of the graft polymerization catalyst to be used differs depending on the type but is preferably 0.1 to 10 parts by weight, more preferably 0.2 to 5 parts by weight, with respect to 100 parts by weight of the synthetic polyisoprene. Further, the method for adding the graft polymerization catalyst is not specifically limited, and known addition methods such as lump addition, divided addition, and continuous addition can be employed.

The conversion rate of the graft polymerization is preferably 95 wt % or more, particularly preferably 97 wt % or more. When the conversion rate of the graft polymerization is excessively low, the tensile strength and the tear strength tend to be low.

The introduction proportion of the monomer having a carboxyl group into the thus obtained carboxyl group-containing synthetic polyisoprene (carboxyl group modification rate) is not specifically limited but is preferably 0.1 to 10 wt %, more preferably 0.5 to 5 wt %, further preferably 1 to 3 wt %, with respect to all isoprene units. Adjusting the introduction proportion of the monomer having a carboxyl group to the aforementioned range allows the dip-molded product such as a glove to have an appropriate hardness and improves the mechanical stability of the carboxyl group-containing synthetic polyisoprene latex, thereby facilitating obtaining the effect of improving the tensile strength and the tear strength of the dip-molded product to be obtained.

The thus obtained carboxyl group-containing synthetic polyisoprene latex may contain additives that are generally contained in the field of latex, such as pH adjusters, defoamers, preservatives, chelating agents, oxygen scavengers, dispersants, and anti-aging agents.

Examples of the pH adjusters include alkali metal hydroxides such as sodium hydroxide and potassium hydroxide; alkali metal carbonates such as sodium carbonate and potassium carbonate; alkali metal hydrogen carbonates such as sodium hydrogen carbonate; ammonia; and organic amine compounds such as trimethylamine and triethanolamine, and alkali metal hydroxides and ammonia are preferable.

Further, in order to increase the solid content concentration of the carboxyl group-containing synthetic polyisoprene latex, concentration operation may be applied after the graft polymerization, as needed, by methods such as vacuum distillation, normal pressure distillation, centrifugation, and membrane concentration, and centrifugation is preferably performed in that the residual amount of anionic surfactants in the carboxyl group-containing synthetic polyisoprene latex can be adjusted.

In the case where the carboxyl group-containing synthetic polyisoprene latex after the graft polymerization is put in a centrifuge, the pH of the latex is preferably adjusted in advance by adding a pH adjuster to 7 or more, more preferably to 9 or more, for improving the mechanical stability of the latex. As the pH adjuster, alkali metal hydroxides such as sodium hydroxide and potassium hydroxide, and ammonia are preferable.

When the pH of the latex is adjusted, the carboxyl group introduced by modification may be in the form of salts.

The centrifugation is preferably performed, for example, using a continuous centrifuge, under the conditions in which the centrifugal force is preferably 4,000 to 5,000 G, the solid content concentration of the carboxyl group-containing synthetic polyisoprene latex before the centrifugation is preferably 2 to 15 wt %, the feed flow rate into the centrifuge is preferably 500 to 2000 Kg/hr, and the back pressure of the centrifuge (gauge pressure) is preferably 0.03 to 1.6 MPa.

The solid content concentration of the carboxyl group-containing synthetic polyisoprene latex used in the present invention is preferably 30 to 70 wt %, more preferably 50 to 70 wt %. Adjusting the solid content concentration to the aforementioned range can suppress the separation of polymer particles during storage of the latex and the occurrence of coarse aggregates due to the polymer particles aggregating with each other.

The volume average particle size of the carboxyl group-containing synthetic polyisoprene latex used in the present invention is preferably 0.1 to 10 μm, more preferably 0.5 to 3 μm, further preferably 1 to 2 μm. Adjusting the volume average particle size to the aforementioned range makes the latex viscosity appropriate to facilitate handling and can suppress formation of a film on the surface of the latex during storage of the carboxyl group-containing synthetic polyisoprene latex.

Further, the total content of anionic surfactants in the carboxyl group-containing synthetic polyisoprene latex used in the present invention is preferably 5 parts by weight or less, more preferably 3 parts by weight or less, further preferably 0.1 to 3 parts by weight, with respect to 100 parts by weight of the carboxyl group-containing synthetic polyisoprene. When the total content of anionic surfactants falls within the aforementioned range, foaming is suppressed, and a dip-molded product with excellent tensile strength and no pinholes is easily obtained.

Carboxyl Group-Containing Styrene-Isoprene-Styrene Block Copolymer Latex

The carboxyl group-containing styrene-isoprene-styrene block copolymer latex (carboxyl group-containing SIS latex) used in the present invention is a latex of styrene-isoprene block copolymer (SIS) ("S" indicates the styrene block, and "I" indicates the isoprene block). In the latex composition of the present invention, the carboxyl group-containing SIS latex can be used, in addition to the aforementioned carboxyl group-containing synthetic polyisoprene latex, or instead of the aforementioned carboxyl group-containing synthetic polyisoprene latex.

The carboxyl group-containing SIS latex used in the present invention is a latex of a carboxyl group-containing SIS obtained by introducing a carboxyl group into a SIS obtained by polymerization of monomers containing styrene and isoprene. The method for producing the carboxyl group-containing SIS used in the present invention is not specifically limited, but a method of obtaining a SIS latex in the same manner as in the aforementioned carboxyl group-containing synthetic polyisoprene latex and, using the obtained SIS latex, graft-polymerizing a monomer having a carboxyl group onto the SIS in the water phase can be used.

The method for producing the SIS latex used in the present invention is not specifically limited, but a method for producing a SIS latex by emulsifying a solution or a micro-suspension of a SIS dissolved or finely dispersed in an organic solvent, in water, in the presence of surfactants and removing the organic solvent, as required, is preferable.

The SIS can be obtained by conventionally known methods such as block copolymerization of isoprene and styrene in an inert polymerization solvent using an active organic metal such as n-butyl lithium as an initiator. The polymer solution of the obtained SIS may be used as it is for producing the SIS latex but can be used for producing the SIS latex by extracting a solid SIS from the polymer solution and thereafter dissolving the solid SIS in an organic solvent.

At this time, impurities such as the residue of the polymerization catalyst remaining in the polymer solution after the synthesis may be removed. Further, an anti-aging agent, which will be described below, may be added into the solution during the polymerization or after the polymerization. Further, a commercially available solid SIS also can be used.

As the organic solvent, the same organic solvent as that for the aforementioned synthetic polyisoprene can be used, and aromatic hydrocarbon solvents and alicyclic hydrocarbon solvents are preferable, and cyclohexane and toluene are particularly preferable.

The amount of the organic solvent to be used is generally 50 to 2,000 parts by weight, preferably 80 to 1,000 parts by weight, more preferably 10 to 500 parts by weight, further preferably 150 to 300 parts by weight, with respect to 100 parts by weight of the SIS.

As the surfactants, the same surfactants as above for the aforementioned synthetic polyisoprene can be mentioned, for example, and anionic surfactants are suitable, and sodium rosinate and sodium dodecylbenzenesulfonate are particularly preferable.

The amount of surfactants to be used is preferably 0.1 to 50 parts by weight, more preferably 0.5 to 20 parts by weight, most preferably 1 to 10 parts by weight, with respect to 100 parts by weight of the SIS. When this amount is excessively small, the stability of the latex tends to be poor. Conversely, when the amount is excessively large, foaming easily occurs, which may possibly cause a problem in dip molding.

The amount of water to be used in the aforementioned method for producing the SIS latex is preferably 10 to 1,000 parts by weight, more preferably 30 to 500 parts by weight, most preferably 50 to 100 parts by weight, with respect to 100 parts by weight of the organic solvent solution of the SIS.

Examples of the type of water to be used include hard water, soft water, deionized water, distilled water, and zeolite water and the like. Further, polar solvents typified by alcohols such as methanol may be used in combination with water.

As the device that emulsifies the organic solvent solution or the microsuspension of the SIS, in water, in the presence of surfactants, the same device as described above for the aforementioned synthetic polyisoprene can be mentioned, for example. The method for adding the surfactants is not specifically limited, and the surfactants may be added in advance to either water, or the organic solvent solution or the microsuspension of the SIS, or both of them, or may be added to the emulsified liquid during the emulsification operation at one time or several times.

In the aforementioned method for producing a SIS latex, the SIS latex is preferably obtained by removing the organic solvent from the emulsion obtained by the emulsification operation. The method for removing the organic solvent from the emulsion is not specifically limited, and methods such as vacuum distillation, normal pressure distillation, water vapor distillation, and centrifugation can be employed.

Further, in order to increase the solid content concentration of the SIS latex, concentration operation may be applied after the removal of the organic solvent, as needed, by methods such as vacuum distillation, normal pressure distillation, centrifugation, and membrane concentration.

The solid content concentration of the SIS latex used in the present invention is preferably 30 to 70 wt %, more preferably 50 to 70 wt %. When the solid content concentration is excessively low, there is concern that latex particles (SIS particles) in the SIS latex separate during storage of the SIS latex. Conversely, when the solid content concentration is excessively high, the SIS particles may aggregate with each other to generate coarse aggregates in some cases.

Further, the SIS latex may contain additives that are generally contained in the field of latex, such as pH adjusters, defoamers, preservatives, crosslinking agents, chelating agents, oxygen scavengers, dispersants, and anti-aging agents. As the pH adjusters, the same pH adjusters as described above for the synthetic polyisoprene can be mentioned, and alkali metal hydroxides and ammonia are preferable.

The content of styrene units in the styrene block of the SIS contained in the thus obtained SIS latex is preferably 70 to 100 wt %, more preferably 90 to 100 wt %, further preferably 100 wt %, with respect to all monomer units.

Further, the content of isoprene units in the isoprene block of the SIS is preferably 70 to 100 wt %, more preferably 90 to 100 wt %, further preferably 100 wt %, with respect to all monomer units.

The content ratio of the styrene units to isoprene units in the SIS is generally in the range of 1:99 to 90:10, preferably 3:97 to 70:30, more preferably 5:95 to 50:50, further preferably 10:90 to 30:70, as a weight ratio of "styrene units: isoprene units".

The weight-average molecular weight of the SIS is preferably 10,000 to 1,000,000, more preferably 50,000 to 500,000, further preferably 100,000 to 300,000, in terms of standard polystyrene by gel permeation chromatography. Adjusting the weight-average molecular weight of the SIS to the aforementioned range tends to improve the balance of the tensile strength and the flexibility of the dip-molded product and facilitate the production of the SIS latex.

The volume average particle size of the latex particles (SIS particles) in the SIS latex is preferably 0.1 to 10 μm, more preferably 0.5 to 3 μm, further preferably 1 to 2 μm. Adjusting the volume average particle size of the latex particles to the aforementioned range makes the latex viscosity appropriate to facilitate handling and can suppress formation of a film on the surface of the latex during storage of the SIS latex.

Subsequently, using the SIS latex obtained by the aforementioned method, the carboxyl group-containing SIS to be used in the present invention can be obtained by graft-polymerizing the monomer having a carboxyl group onto the SIS in the water phase. As the method for graft-polymerizing the monomer having a carboxyl group onto the SIS, the same method as described above for the carboxyl group-containing synthetic polyisoprene can be used.

Further, also at this time, it is preferable to add a redox catalyst in which an organic peroxide is combined with a reductant to the SIS latex obtained by the aforementioned method in addition to the monomer having a carboxyl group, to cause crosslinking reaction of the SIS simultaneously with the graft polymerization of the monomer having a carboxyl group in the water phase, during the production of the carboxyl group-containing SIS latex, so that the undissolved residue of tetrahydrofuran of the carboxyl group-containing SIS contained in the carboxyl group-containing SIS latex is preferably 30 wt % or more, more preferably 60 wt % or more.

The introduction proportion of the monomer having a carboxyl group into the carboxyl group-containing SIS (carboxyl group modification rate) used in the present invention is not specifically limited but is preferably 0.1 to 10 wt %, more preferably 0.5 to 6 wt %, with respect to all isoprene units contained in the SIS. Adjusting the introduction proportion of the monomer having a carboxyl group to the aforementioned range allows the dip-molded product such as a glove to have an appropriate hardness and improves the mechanical stability of the carboxyl group-containing SIS latex, thereby facilitating obtaining the effect of improving the tensile strength and the tear strength of the dip-molded product to be obtained.

Latex Composition

The latex composition of the present invention contains an aqueous solution of an aluminum compound in addition to the aforementioned carboxyl group-containing synthetic polyisoprene latex and/or the aforementioned carboxyl group-containing SIS latex.

In the latex composition of the present invention, the aluminum compound acts as a crosslinking agent to crosslink the carboxyl group-containing synthetic polyisoprene and/or the carboxyl group-containing SIS, thereby allowing a dip-molded product that is flex and has excellent mechanical properties such as tensile strength to be obtained. Further, the dip-molded product to be obtained has a reduced content of sulfurs, and therefore the occurrence of allergic symptoms of delayed allergy (Type IV) in addition to immediate allergy (Type I) is effectively prevented.

As the aqueous solution of the aluminum compound to be used in the present invention, an aluminum compound dissolved in water is preferable, but an aluminum compound partially or completely dispersed in water also may be used. The aluminum compound is not specifically limited, but examples thereof include aluminum chloride, aluminum nitrate, aluminum sulfate, aluminum metal, aluminum ammonium sulfate, aluminum bromide, aluminum fluoride, potassium aluminum sulfate, aluminum isopropoxide, sodium aluminate, potassium aluminate, sodium aluminum sulfite and the like. Among these, metal salts of aluminate are preferable, and sodium aluminate is more preferable, since they can favorably crosslink the carboxyl group-containing synthetic polyisoprene and/or the carboxyl group-containing SIS.

The amount of the aluminum compound contained in the latex composition of the present invention is preferably 0.1 to 10 parts by weight, more preferably 0.5 to 5 parts by weight, with respect to 100 parts by weight of the total of the carboxyl group-containing synthetic polyisoprene and the carboxyl group-containing SIS, in tams of solid content.

The concentration of the aluminum compound in the aqueous solution of the aluminum compound is not specifically limited, but is preferably 0.1 to 10 wt %, more preferably 0.5 to 5 wt %.

Further, the pH of the aqueous solution of the aluminum compound is preferably 5 to 13, more preferably 7 to 12, further preferably 10 to 12. Adjusting the pH to the aforementioned range can make the coordination structure of the aluminum compound in the aqueous solution of the aluminum compound suitable to act as a crosslinking agent and can thereby enhance the mechanical properties of the dip-molded product to be obtained more suitably. The pH of the aqueous solution of the aluminum compound can be adjusted, for example, using acidic compounds such as glycolic acid and alkaline compounds such as ammonia, sodium hydroxide, and potassium hydroxide.

Further, the latex composition of the present invention may contain sulfur vulcanizing agents, sulfur vulcanization accelerators, and the like without inhibiting the operational effects of the present invention (for example, as long as the dip-molded product to be obtained does not cause allergic symptoms of delayed allergy (Type IV) in human bodies). Containing sulfur vulcanizing agents, sulfur vulcanization accelerators, and the like, can further enhance the mechanical properties of the dip-molded product to be obtained.

Examples of the sulfur vulcanizing agents include sulfurs such as powder sulfur, flowers of sulfur, precipitated sulfur, colloid sulfur, surface-treated sulfur, and insoluble sulfur; and sulfur-containing compounds such as sulfur chloride, sulfur dichloride, morpholine disulfide, alkylphenol disulfide, N,N'-dithio-bis(hexahydro-2H-azepinone-2), phosphorus-containing polysulfides, polymer polysulfides, and 2-(4'-moipholinodithio) benzothiazole. Among these, sulfurs can be preferably used. One of these sulfur vulcanizing agents can be used alone, or two or more of them can be used in combination.

The amount of the sulfur vulcanizing agents to be used may be within the range that does not inhibit the operational effects of the present invention and is not specifically limited but is preferably 1.0 part by weight or less, more preferably 0.05 to 1.0 part by weight, further preferably 0.05 to 0.8 parts by weight, most preferably 0.1 to 0.4 parts by weight, with respect to 100 parts by weight of the total of the carboxyl group-containing synthetic polyisoprene and the carboxyl group-containing SIS.

As the sulfur vulcanization accelerators, sulfur vulcanization accelerators that are generally used in dip molding can be used, and examples thereof include dithiocarbamic acids such as diethyl dithiocarbamic acid, dibutyl dithiocarbamic acid, di-2-ethylhexyl dithiocarbamic acid, dicyclohexyl dithiocarbamic acid, diphenyl dithiocarbamic acid, and dibenzyl dithiocarbamic acid, and zinc salts thereof; 2-mercaptobenzothiazole, 2-mercaptobenzothiazole zinc, 2-mercaptothiazoline, dibenzothiazyl disulfide, 2-(2,4-dinitrophenylthio)benzothiazole, 2-(N,N-diethylthio carbaylthio)benzothiazole, 2-(2,6-dimethyl-4-morpholinothio)benzothiazole, 2-(4'-morpholino dithio)benzothiazole, 4-morpholinyl-2-benzothiazyl disulfide, and 1,3-bis(2-benzothiazyl mercaptomethyl)urea, and zinc diethyldithiocarbamate, 2-mercaptobenzothiazole, and zinc 2-mercaptobenzothiazole are preferable. One of these vulcanization accelerators can be used alone, or two or more of them can be used in combination.

The amount of the sulfur vulcanization accelerators to be used may be within the range that does not inhibit the operational effects of the present invention and is not specifically limited but is preferably 1.0 part by weight or less, more preferably 0.05 to 1.0 part by weight, further preferably 0.01 to 0.5 parts by weight, most preferably 0.05 to 0.25 parts by weight, with respect to 100 parts by weight of the total of the carboxyl group-containing synthetic polyisoprene and the carboxyl group-containing SIS.

Further, the latex composition of the present invention preferably further contains zinc oxide. The content of the zinc oxide is not specifically limited but is preferably 0.1 to 5 parts by weight, more preferably 0.2 to 2 parts by weight, with respect to 100 parts by weight of the total of the synthetic polyisoprene and the SIS. When this amount is excessively small, the tensile strength of the dip-molded product tends to decrease, and when the amount is excessively large, the stability of the carboxyl group-containing synthetic polyisoprene particles and the carboxyl group-containing SIS particles in the latex composition may decrease to cause coarse aggregates in some cases.

The latex composition of the present invention can further contain compounding agents including dispersants; anti-aging agents; reinforcers such as carbon black, silica, and talc; fillers such as calcium carbonate and clay; ultraviolet absorbers; and plasticizers, as required.

Examples of the anti-aging agents include phenolic anti-aging agents containing no sulfur atoms such as 2,6-di-4-methylphenol, 2,6-di-t-butylphenol, butylhydroxyanisole, 2,6-di-t-butyl-α-dimethylamino-p-cresol, octadecyl-3-(3,5-di-t-butyl-4-hydroxyphenyl)propionate, styrenated phenol, 2,2'-methylene-bis(6-α-methyl-benzyl-p-cresol), 4,4'-methylenebis(2,6-di-t-butylphenol), 2,2'-methylene-bis(4-methyl-6-t-butylphenol), alkylated bisphenol, and a butylated reaction product of p-cresol with dicyclopentadiene; thiobisphenol anti-aging agents such as 2,2'-thiobis-(4-methyl-6-t-butylphenol), 4,4'-thiobis-(6-t-butyl-o-cresol), and 2,6-di-t-butyl-4-(4,6-bis(octylthio)-1,3,5-triazin-2-ylamino)phenol; phosphite ester anti-aging agents such as tris(nonylphenyl) phosphite, diphenylisodecyl phosphite, and tetraphenyl dipropylene glycol diphosphite; sulfur ester anti-aging agents such as dilauryl thiodipropionate; amine anti-aging agents such as phenyl-α-naphthyl amine, phenyl-β-naphthyl amine, p-(p-toluenesulfonylamide)-diphenylamine, 4,4'-(α,α-dimethylbenzyl)diphenylamine, N,N-diphenyl-p-phenylenediamine, N-isopropyl-N'-phenyl-p-phenylenediamine, and butyl aldehyde-aniline condensate; quinoline anti-aging agents such as 6-ethoxy-2,2,4-trimethyl-1,2-dihydroquinoline; and hydroquinone anti-aging agents such as 2,5-di-(t-amyl)hydroquinone. One of these anti-aging agents can be used alone, or two or more of them can be used in combination.

The amount of the anti-aging agents to be used is preferably 0.05 to 10 parts by weight, more preferably 0.1 to 5 parts by weight, with respect to 100 parts by weight of the total of the carboxyl group-containing synthetic polyisoprene and the carboxyl group-containing SIS.

The method for preparing the latex composition of the present invention is not specifically limited, but examples thereof include a method of mixing the aqueous solution of the aluminum compound and various compounding agents contained as required with the carboxyl group-containing synthetic polyisoprene latex and/or the carboxyl group-containing SIS latex using dispersers such as ball mills, kneaders, and dispersers, and a method of preparing an aqueous dispersion of desired mixed ingredients other than the carboxyl group-containing synthetic polyisoprene latex and/or the carboxyl group-containing SIS latex using the aforementioned dispersers in advance and thereafter mixing the aqueous dispersion with the carboxyl group-containing synthetic polyisoprene latex and/or the carboxyl group-containing SIS latex.

The latex composition of the present invention preferably has a pH of 7 or more, more preferably a pH in the range of 7 to 13, further preferably a pH in the range of 8 to 12. Further, the solid content concentration of the latex composition is preferably in the range of 15 to 65 wt %.

The latex composition of the present invention is preferably aged (precrosslinked) before dip molding, for further enhancing the mechanical properties of the dip-molded product to be obtained. The precrosslinking time is not specifically limited and depends also on the precrosslinking temperature but is preferably 1 to 14 days, more preferably 1 to 7 days. The precrosslinking temperature is preferably 20 to 40° C.

Then, after the precrosslinking, the latex composition is preferably stored at a temperature of 10 to 30° C. until the dip molding. If it is stored at high temperature, the tensile strength of the dip-molded product to be obtained may possibly decrease in some cases.

Molded Film

The molded film of the present invention is a molded product in the form of a film composed of the latex composition of the present invention. The film thickness of the molded film of the present invention is preferably 0.03 to 0.50 mm, more preferably 0.05 to 0.40 mm, particularly preferably 0.08 to 0.30 mm.

The molded film of the present invention is not specifically limited but is suitably a dip-molded product obtained by dip-molding the latex composition of the present invention.

Dip-Molded Product

The dip-molded product of the present invention is obtained by dip-molding the latex composition of the present invention. The dip molding is a method of immersing a mold in the latex composition, depositing the composition on the surface of the mold, then pulling the mold out of the composition, and thereafter drying the composition deposited on the surface of the mold. The mold before the immersion in the latex composition may be preheated. Further, before the mold is immersed in the latex composition or after the mold is pulled out of the latex composition, a coagulant can be used, as required.

Specific examples of the method for using the coagulant include a method of attaching the coagulant to the mold by immersing, in a coagulant solution, the mold before the immersion in the latex composition (anode coagulant dipping), and a method of immersing the mold on which the latex composition has been deposited in a coagulant solution (Teague coagulant dipping), and the anode coagulant dipping is preferable in that a dip-molded product with less unevenness in thickness is obtained.

Specific examples of the coagulant include water-soluble polyvalent metal salts including metal halides such as barium chloride, calcium chloride, magnesium chloride, zinc chloride, and aluminum chloride; nitrates such as barium nitrate, calcium nitrate, and zinc nitrate; acetates such as barium acetate, calcium acetate, and zinc acetate; and sulfates such as calcium sulfate, magnesium sulfate, and aluminum sulfate. Among these, calcium salts are preferable, and calcium nitrate is more preferable. One of these water-soluble polyvalent metal salts can be used alone, or two or more of them can be used in combination.

The coagulant is preferably used in the form of an aqueous solution. The aqueous solution may further contain water-soluble organic solvents such as methanol and ethanol, and nonionic surfactants. The concentration of the coagulant differs depending on the type of the water-soluble polyvalent metal salts but is preferably 5 to 50 wt %, more preferably 10 to 30 wt %.

The mold after being pulled out of the latex composition is generally heated to dry the deposit famed on the mold. The drying conditions may be appropriately selected.

Then, the deposit famed on the mold by heating is crosslinked.

The heating conditions for crosslinking are not specifically limited but are preferably a heating temperature of 60 to 150° C., more preferably 100 to 130° C., and preferably a heating time of 10 to 120 minutes.

The heating method is not specifically limited, but examples thereof include a method of heating by hot air in an oven and a method of heating by irradiation with infrared rays.

Further, before or after heating the mold on which the latex composition has been deposited, the mold is preferably washed with water or hot water in order to remove water-soluble impurities (such as excess surfactants or coagulants). The hot water to be used is preferably at 40° C. to 80° C., more preferably at 50° C. to 70° C.

The dip-molded product after the crosslinking is detached from the mold. Specific examples of the detaching method include a method of separating the dip-molded product from the mold by hand, and a method of separating the dip-molded product by water pressure or compressed air pressure and the like. If the dip-molded product during the crosslinking has a sufficient strength to be detached, the dip-molded product may be detached in the course of the crosslinking, and subsequently the crosslinking may be continued.

The dip-molded product of the present invention has excellent mechanical properties such as tensile strength and can prevent the occurrence of the allergic symptoms of delayed allergy (Type IV) in addition to immediate allergy (Type I), and therefore can be used particularly suitably as gloves. In the case where the dip-molded product is a glove, inorganic fine particles such as talc and calcium carbonate or organic fine particles such as starch particles may be spread onto the surface of the glove, an elastomer layer containing fine particles may be famed on the surface of the glove, or the surface layer of the glove may be chlorinated, in order to prevent close contact between the contact surfaces of the dip-molded product with each other and improve the sliding when putting it on and taking it off.

Further, the dip-molded product of the present invention can be used as medical supplies such as baby bottle nipples, droppers, tubes, water pillows, balloon stalls, catheters, and condoms; toys such as balloons, dolls, and balls; industrial supplies such as pressure molding bags and gas storage bags; and fingerstalls, other than the aforementioned gloves.

EXAMPLES

Hereinafter, the present invention will be described more specifically by way of examples and comparative examples, but the present invention is not limited to these examples. In the following description, "part(s)" is on a weight basis, unless otherwise specified. The tests or evaluation methods of the physical properties and characteristics were as follows.

Undissolved Amount of Tetrahydrofuran 300 mg of a carboxyl group-containing synthetic polyisoprene obtained by putting 15 g of a latex into a Petri dish made of polytetrafluoroethylene, followed by air drying at 25° C. for 2 days and thereafter vacuum drying at 40° C. for 24 hours was accurately weighed, and the carboxyl group-containing synthetic polyisoprene put into a basket made of 100-mesh stainless steel wire mesh was immersed in 100 ml of tetrahydrofuran, followed by standing at 25° C. for 48 hours. Then, the immersed basket was pulled out of tetrahydrofuran, followed by air drying, and thereafter the whole basket was vacuum-dried at 60° C. overnight. After the drying, the undissolved amount remaining in the basket was accurately weighed, and the proportion (%) thereof with respect to the weight of the carboxyl group-containing synthetic polyisoprene before the immersion in tetrahydrofuran was calculated, thereby determining the undissolved amount of tetrahydrofuran.

Tensile Strength, Elongation, and 500% Tensile Stress of Dip-Molded Product

Based on ASTM D412, a film-like dip-molded product with a film thickness of about 0.2 mm was punched out using a dumbbell (product name "SUPER DUMBBELL (type: SDMK-100C)" manufactured by DUMBBELL CO., LTD.), to produce a test piece for tensile strength measurement. The test piece was stretched using a TENSILON Universal Material Testing Instrument (product name "RTG-1210" manufactured by A&D Company, Limited) at a tensile speed of 500 mm/min, to measure the tensile strength (unit: MPa) immediately before breaking, the elongation (unit: %) immediately before breaking, and the tensile stress (unit: MPa) at an elongation of 500%.

Tear Strength of Dip-Molded Product

Based on ASTM D624-00, a film-like dip-molded product with a film thickness of about 0.2 mm, after being allowed to stand in a constant temperature and humidity chamber at 23° C. and a relative humidity of 50% for 24 hours or more, was punched out using a dumbbell (product name "Die C" manufactured by DUMBBELL CO., LTD.), to produce a test piece for tear strength measurement. The test piece was stretched using a TENSILON Universal Material Testing Instrument (product name "RTG-1210" manufactured by A&D Company, Limited) at a tensile speed of 500 mm/min, to measure the tear strength (unit: N/mm).

Stress Retention

The tensile stress of a film-like dip-molded product with a film thickness of about 0.2 mm was measured immediately after an elongation of 100% was achieved and after the elongation of 100% was maintained for 6 minutes, using a TENSILON Universal Material Testing Instrument (product name "RTG-1210" manufactured by ORIENTEC CORPORATION), to determine the stress retention (the tensile stress after the elongation of 100% was maintained for 6 minutes/the tensile stress immediately after the elongation of 100% was achieved) (unit: %).

Patch Test

A test piece obtained by cutting the film-like dip-molded product with a film thickness of about 0.2 mm into a size of 10×10 mm was applied to an aim of each of 10 subjects. Thereafter, the occurrence of the allergic symptoms of immediate allergy (Type I) was checked by observing the applied part after a lapse of 180 minutes, and the occurrence of allergic symptoms of delayed allergy (Type IV) was further checked by observing the applied part after a lapse of 48 hours. The observation results were evaluated based on the following criteria.

Good: No allergic symptoms were observed in any of the subjects after both 180 minutes and 48 hours from the application.

Poor: Although no allergic symptoms were observed in any of the subjects after 180 minutes from the application, but allergic symptoms were observed in some of the subjects after 48 hours from the application.

Preparation Example 1

100 parts of a synthetic polyisoprene (product name "NIPOL IR2200L" manufactured by Zeon Corporation, a homopolymer of isoprene with an amount of cis bond units of 98%) having a weight-average molecular weight of 1,300,000 was mixed with 1,150 parts of cyclohexane, and the mixture was dissolved by raising the temperature to 60° C. under stirring, to prepare a cyclohexane solution of the synthetic polyisoprene (a).

Meanwhile, 10 parts of sodium rosinate and 5 parts of sodium dodecylbenzenesulfonate were mixed with water, to prepare an aqueous solution of an anionic surfactant (b) having a concentration of 1.5 wt % at a temperature of 60° C. and containing a mixture at a weight ratio of sodium rosinate/sodium dodecylbenzenesulfonate=2/1.

Next, the cyclohexane solution (a) and the aqueous solution of an anionic surfactant (b) were mixed at a weight ratio of 1:1.5 (the solid content ratio at this time was polyisoprene:anionic surfactants=8:2.25), using the product name "Multi Line mixer MS26-MMR-5.5L" (manufactured by SATAKE CHEMICAL EQUIPMENT MFG., LTD.), and the mixture was thereafter mixed and emulsified at 4100 rpm using the product name "MILDER MDN310" (manufactured by Pacific Machinery & Engineering Co., Ltd.), to obtain an emulsified liquid (c). At that time, the feed flow rate of the total of the cyclohexane solution (a) and the aqueous solution of an anionic surfactant (b) was 2,000 kg/hr, the temperature was 60° C., and the back pressure (gauge pressure) was 0.5 MPa.

Then, the emulsified liquid (c) was heated to 80° C. under a reduced pressure of −0.01 to −0.09 MPa (gauge pressure) to distill off cyclohexane, thereby obtaining an aqueous dispersion of the synthetic polyisoprene (d). At that time, the product name "SM5515" (Dow Corning Toray Co., Ltd.) was used as a defoamer and was continuously added by spraying to an amount of 300 weight ppm with respect to the synthetic polyisoprene in the emulsified liquid (c). When the cyclohexane was distilled off, the emulsified liquid (c) was adjusted to be 70 volume % or less of the volume of the tank and was gradually stirred at 60 rpm, using a 3-step inclined paddle blade as a stirring blade.

Then, after the distillation of cyclohexane was completed, the obtained aqueous dispersion (d) was centrifuged at 4,000 to 5,000 G using a continuous centrifuge (product name "SRG510" manufactured by Alfa Laval AB), to obtain a synthetic polyisoprene latex (e1) having a solid content concentration of 56 wt % as a light liquid. The conditions for the centrifugation were a solid content concentration of the aqueous dispersion (d) before the centrifugation of 10 wt %, a flow rate in the continuous centrifugation of 1300 kg/hr, and a back pressure (gauge pressure) of the centrifuge of 1.5 MPa. The obtained synthetic polyisoprene latex (e1) had a solid content concentration of 56 wt %, a volume average particle size of 1.0 μm, pH=10, a viscosity as measured by a type B viscometer of 120 mPa·s, and the total content of anionic surfactants of 3.0 parts per 100 parts of the synthetic polyisoprene. Further, no aggregates were observed in the latex (e1), and the amount of residual metals (the total content of aluminum atoms and titanium atoms) in the latex (e1) was 250 weight ppm.

Preparation Example 2

A styrene-isoprene-styrene block copolymer latex (e2) was obtained in the same manner as in Preparation Example 1 except that a styrene-isoprene-styrene block copolymer (SIS) (product name "QUINTAC 3620" manufactured by Zeon Corporation) was used instead of the synthetic polyisoprene (product name "NIPOL IR2200L" manufactured by Zeon Corporation).

Example 1

Preparation of Carboxyl Group-Containing Synthetic Polyisoprene (A1-1) Latex 850 parts of distilled water was added to 100 parts of the synthetic polyisoprene of the synthetic polyisoprene latex (e1) obtained in Preparation Example 1 for dilution. The thus diluted latex was put into a nitrogen-purged polymerization reaction container equipped with a stirrer and heated to a temperature of 30° C. under stirring. Further, using another container, 10 parts of methacrylic acid and 16 parts of distilled water were mixed together to prepare a diluted solution of methacrylic acid. The diluted solution of methacrylic acid was added to the polymerization reaction container heated to 30° C. over 30 minutes.

Further, using another container, a solution (g) composed of 7 parts of distilled water, 0.32 part of sodium formaldehyde sulfoxylate (product name "SFS" manufactured by MITSUBISHI GAS CHEMICAL COMPANY, INC.), and 0.01 part of ferrous sulfate (product name "Frost Fe" manufactured by CHELEST CORPORATION) was prepared. After the solution (g) was added into the polymerization reaction container, 1 part of 1,1,3,3-tetramethylbutyl hydroperoxide (product name "PEROCTA H" manufactured by NOF CORPORATION) was added thereto, and the mixture was allowed to react at 30° C. for 1 hour, followed by further reaction at 70° C. for 2 hours, for graft polymerization. The conversion rate of the graft polymerization was 99 wt %. Further, the introduction proportion of methacrylic acid monomer units (carboxyl group modification rate) was 3 wt % with respect to all isoprene units.

After the reaction, sodium hydroxide was added thereto to adjust the pH to 10, followed by centrifugation at 4,000 to 5,000 G (with a flow rate of 1700 kg/hr and a back pressure (gauge pressure) of the centrifuge of 0.08 MPa) using a continuous centrifuge (product name "SRG510" manufactured by Alfa Laval AB), to obtain latex of a carboxyl group-containing synthetic polyisoprene (A1-1) having a solid content concentration of 56 wt %, a pH of 10, a viscosity as measured by a type B viscometer of 180 mPa·s, a volume average particle size of 1.0 wt, the total content of anionic surfactants of 1.9 parts (with respect to 100 parts by weight of the carboxyl group-containing synthetic polyisoprene), a residual cyclohexane of 10 weight ppm, and a residual amount of 1,1,3,3-tetramethyl-1-butanol (boiling point: 145° C.) as a decomposed product of 1,1,3,3-tetramethylbutyl hydroperoxide of 119 weight ppm. The undissolved amount of tetrahydrofuran of the carboxyl group-containing synthetic polyisoprene (A1-1) in the latex was 30% or more.

Preparation of Latex Composition

First, sodium hydroxide was added to a styrene-maleic acid mono-sec-butyl ester-maleic acid monomethyl ester polymer (product name "Scripset550" manufactured by Hercules Inc.), thereby neutralizing 100% of carboxyl groups in the polymer, to prepare an aqueous solution of a sodium salt (concentration: 10 wt %) as a dispersant (i). Then, the dispersant (i) was added to the latex of the carboxyl group-containing synthetic polyisoprene (A1-1) to 0.8 part with respect to 100 parts of the carboxyl group-containing synthetic polyisoprene (A1-1) obtained above, in terms of solid content. Then, an aqueous dispersion of each compounding agent was added to the obtained mixture under stirring, so that an aqueous solution of sodium aluminate having a pH of 12 accounted for 1 part with respect to 100 parts of the carboxyl group-containing synthetic polyisoprene (A1-1) in the mixture in terms of solid content, and thereafter an aqueous solution of potassium hydroxide was added thereto, to obtain a latex composition (j) whose pH was adjusted to 10.5. Thereafter, the obtained latex composition (j) was aged (precrosslinked) in a thermostatic bath at 25° C. for 48 hours.

Production of Dip-Molded Product

A surface-textured glass mold (with a diameter of about 5 cm and a length of the textured part of about 15 cm) was washed and preheated in an oven at 70° C., and thereafter the mold was immersed in an aqueous solution of a coagulant composed of 18 wt % of calcium nitrate and 0.05 wt % of polyoxyethylene lauryl ether (product name "EMULGEN 109P" manufactured by Kao Corporation) for 5 seconds and was taken out. Subsequently, the glass mold coated with the coagulant was dried in an oven at 70° C. Thereafter, the glass mold coated with the coagulant taken out of the oven was immersed in the latex composition (j) obtained above under the conditions of 25° C. and 10 seconds and taken out, followed by drying at room temperature for 60 minutes, to obtain a glass mold coated with a film. Then, the glass mold coated with the film was immersed in hot water at 60° C. for 2 minutes, followed by air drying at room temperature for 30 minutes. Thereafter, the glass mold coated with the film was placed in an oven at 120° C. to allow crosslinking for 20 minutes. The glass mold coated with the crosslinked film was cooled to the room temperature, and talc was spread, followed by separation of the film from the glass mold, to obtain a film with a thickness of about 0.2 mm (dip-molded product). Then, for the obtained film (dip-molded product), each measurement of tensile strength, elongation, 500% tensile stress, tear strength, and stress retention, patch test, and evaluation were performed. Table 1 shows the results.

Example 2

A latex composition having a pH of 10.5 and a dip-molded product thereof were obtained in the same manner as in Example 1 except that the aqueous solution of sodium aluminate added to the carboxyl group-containing synthetic polyisoprene (A1-1) in the preparation of the latex composition had a pH of 8, and evaluation was performed in the same manner. Table 1 shows the results.

Example 3

A latex of a carboxyl group-containing polyisoprene (A1-2) was obtained in the same manner as in Example 1 except that the amount of the diluted solution of methacrylic acid added to the synthetic polyisoprene latex (e1) was changed to adjust the introduction proportion of methacrylic acid monomer units (carboxyl group modification rate) by graft polymerization to 1 wt % with respect to all isoprene units.

Then, a latex composition having a pH of 10.5 and a dip-molded product thereof were obtained in the same manner as in Example 1 except that the latex of the carboxyl group-containing polyisoprene (A1-2) obtained above was used instead of the latex of the carboxyl group-containing synthetic polyisoprene (A1-1), and evaluation was performed in the same manner. Table 1 shows the results.

Example 4

A latex composition having a pH of 10.5 and a dip-molded product thereof were obtained in the same manner as in Example 3 except that 0.4 part of sulfur as a sulfur vulcanizing agent and 0.25 part of the total of zinc diethyldithiocarbamate (Nocceler EZ, manufactured by OUCHI SHINKO CHEMICAL INDUSTRIAL CO., LTD industrial) and zinc dibutyldithiocarbamate (Nocceler BZ-P (BZ), manufactured by OUCHI SHINKO CHEMICAL INDUSTRIAL CO., LTD industrial) as sulfur vulcanization accelerators were added with respect to 100 parts of the carboxyl group-containing synthetic polyisoprene (A1-2) in the preparation of the latex composition, and evaluation was performed in the same manner. Table 1 shows the results.

Example 5

A latex composition having a pH of 10.5 and a dip-molded product thereof were obtained in the same manner as in Example 4 except that the amount of sulfur as a sulfur vulcanizing agent to be added was changed to 0.8 part, and the amount of the total of zinc diethyldithiocarbamate (Nocceler EZ, manufactured by OUCHI SHINKO CHEMICAL INDUSTRIAL CO., LTD industrial) and zinc dibutyldithiocarbamate (Nocceler BZ-P (BZ), manufactured by OUCHI SHINKO CHEMICAL INDUSTRIAL CO., LTD industrial) as sulfur vulcanization accelerators to be added was changed to 0.5 part, and evaluation was performed in the same manner. Table 1 shows the results.

Example 6

A latex of a carboxyl group-containing SIS (A2-1) was obtained in the same manner as in Example 1 except that the styrene-isoprene-styrene block copolymer latex (e2) obtained in Preparation Example 2 was used instead of the synthetic polyisoprene latex (e1) obtained in Preparation Example 1, and the amount of the diluted solution of methacrylic acid added was changed so that the introduction proportion of methacrylic acid monomer units (carboxyl group modification rate) by graft polymerization was 1 wt % with respect to all isoprene units contained in the styrene-isoprene-styrene block copolymer.

Then, a latex composition having a pH of 10.5 and a dip-molded product thereof were obtained in the same manner as in Example 5 except that the latex of the carboxyl group-containing SIS (A2-1) obtained above was used instead of the latex of the carboxyl group-containing synthetic polyisoprene (A1-1), and evaluation was performed in the same manner. Table 1 shows the results.

Comparative Example 1

A latex composition having a pH of 10.5 and a dip-molded product thereof were obtained in the same manner as in Example 1 except that latex of a synthetic polyisoprene (unmodified synthetic polyisoprene (A1'-3)) obtained in Preparation Example 1 was used instead of the latex of the carboxyl group-containing synthetic polyisoprene (A1-1), and evaluation was performed in the same manner. Table 1 shows the results.

Comparative Example 2

A latex composition having a pH of 10.5 and a dip-molded product thereof were obtained in the same manner as in Example 4 except that the aqueous solution of sodium aluminate was not added, and further the amount of sulfur as a sulfur vulcanizing agent added was changed to 1.6 parts, and the amount of the total of zinc diethyldithiocarbamate (Nocceler EZ, manufactured by OUCHI SHINKO CHEMICAL INDUSTRIAL CO., LTD industrial) and zinc dibutyldithiocarbamate (Nocceler BZ-P (BZ), manufactured by OUCHI SHINKO CHEMICAL INDUSTRIAL CO., LTD industrial) as sulfur vulcanization accelerators added was changed to 1.0 part, and evaluation was performed in the same manner. Table 1 shows the results.

TABLE 1

|  |  | Example | | | | | | Comparative Example | |
|---|---|---|---|---|---|---|---|---|---|
|  |  | 1 | 2 | 3 | 4 | 5 | 6 | 1 | 2 |
| Composition of latex composition | | | | | | | | | |
| Carboxyl group-containing synthetic polyisoprene (A1-1) (Carboxyl group introduction proportion: 3 wt %) | (parts) | 100 | 100 | | | | | | |
| Carboxyl group-containing synthetic polyisoprene (A1-2) (Carboxyl group introduction proportion: 1 wt %) | (parts) | | | 100 | 100 | 100 | | | 100 |
| Unmodified synthetic polyisoprene (A1'-3) | (parts) | | | | | | | 100 | |
| Carboxyl group-containing SIS (A2-1) (Carboxyl group introduction proportion: 1 wt %) | (parts) | | | | | | 100 | | |
| Aqueous solution of sodium aluminate (pH 12) | (parts) | 1 | | 1 | 1 | 1 | 1 | 1 | |
| Aqueous solution of sodium aluminate (pH 8) | (parts) | | 1 | | | | | | |
| Sulfur | (parts) | | | | 0.4 | 0.8 | 0.8 | | 1.6 |
| Sulfur vulcanization accelerator | (parts) | | | | 0.25 | 0.5 | 0.5 | | 1.0 |
| Evaluation | | | | | | | | | |
| Tensile strength | (Mpa) | 35 | 31 | 18 | 22 | 25 | 24 | Unmeasurable | 30 |
| Tensile elongation | (%) | 980 | 900 | 1310 | 1150 | 1080 | 940 | | 900 |
| 500% tensile stress | (Mpa) | 2.0 | 1.6 | 0.8 | 1.4 | 1.8 | 2.1 | | 2.0 |
| Tear strength | (N/mm) | 45 | 38 | 20 | 24 | 30 | 26 | | 40 |
| Stress retention | (%) | 87 | 90 | 92 | 91 | 90 | 85 | | 87 |
| Patch test | | ○ | ○ | ○ | ○ | ○ | ○ | | x |

From Table 1, the dip-molded product obtained using the latex composition famed by adding the aqueous solution of the aluminum compound to the carboxyl group-containing synthetic polyisoprene or the carboxyl group-containing styrene-isoprene-styrene block copolymer latex exhibited good results of the patch test. Thus, the dip-molded product could prevent the occurrence of allergic symptoms of delayed allergy (Type IV) in addition to immediate allergy (Type I) and further had excellent mechanical properties such as tensile strength, tensile elongation, 500% tensile stress, tear strength, and stress retention (Examples 1 to 6).

Meanwhile, crosslinking by the aluminum compound did not proceed in the dip-molded product obtained using the latex composition using unmodified synthetic polyisoprene, and a dip-molded product worth evaluating could not be obtained (Comparative Example 1).

Further, in the case of using the sulfur crosslinking agent and the sulfur crosslinking accelerators instead of the aqueous solution of the aluminum compound, in an equivalent amount, the dip-molded product obtained caused the allergic symptoms of delayed allergy (Type IV) according to the result of the patch test (Comparative Example 2).

The invention claimed is:

1. A latex composition formed by adding an aqueous solution of an aluminum compound to a latex of a carboxyl group-containing synthetic polyisoprene,
   wherein the carboxyl group-containing synthetic polyisoprene is obtained by graft polymerization of a monomer having a carboxyl group onto a synthetic polyisoprene, the synthetic polyisoprene being a homopolymer of isoprene, an introduction proportion of the monomer having a carboxyl group into the carboxyl group-containing synthetic polyisoprene being 1 to 3 wt % with respect to all isoprene units, the monomer having a carboxyl group being acrylic acid or methacrylic acid,
   wherein the aqueous solution of an aluminum compound is an aqueous solution of a sodium aluminate,
   wherein the amount of the aluminum compound is 0.5 to 5 parts by weight, with respect to 100 parts by weight of the carboxyl group-containing synthetic polyisoprene, in terms of solid content,
   wherein the latex composition has a pH of from 7 to 13, and
   wherein the aqueous solution of an aluminum compound has a pH of 5 to 13.

2. The latex composition according to claim 1, further comprising 0.05 to 1.0 part by weight of a sulfur vulcanizing agent with respect to 100 parts by weight of the carboxyl group-containing synthetic polyisoprene.

3. The latex composition according to claim 1, further comprising 0.05 to 1.0 part by weight of a sulfur vulcanization accelerator with respect to 100 parts by weight of the carboxyl group-containing synthetic polyisoprene.

4. A molded film consisting of the latex composition according to claim 1.

5. A method for producing a dip-molded product, comprising a step of dip-molding the latex composition according to claim 1.

* * * * *